United States Patent [19]

Gould, Jr.

[11] 3,890,900
[45] June 24, 1975

[54] ELECTRICAL SAFING AND ARMING CIRCUIT

[75] Inventor: William I. Gould, Jr., Silver Spring, Md.

[73] Assignee: The United States of America as represented by the Secretary of the Army, Washington, D.C.

[22] Filed: Oct. 5, 1960

[21] Appl. No.: 60,755

[52] U.S. Cl. ................. 102/70.2 R; 330/1; 328/259
[51] Int. Cl. .......................................... F42c 15/40
[58] Field of Search ....... 330/1, 127, 129, 136, 138, 330/141, 199, 204; 328/259; 102/70.2; 136/112, 113, 114; 250/17.01

[56] References Cited
UNITED STATES PATENTS

| | | | |
|---|---|---|---|
| 2,906,206 | 9/1959 | Morison et al | 102/70.2 |
| 2,907,023 | 9/1959 | Skinner | 102/70.2 |
| 2,970,279 | 1/1961 | Donnelly | 250/17.01 |

*Primary Examiner*—Maynard R. Wilbur
*Assistant Examiner*—N. Moskowitz
*Attorney, Agent, or Firm*—Nathan Edelberg; Robert P. Gibson; Saul Elbaum

[57] ABSTRACT

An electronic safety and arming circuit is disclosed for fuze systems in ordinance missiles. Specifically, the system is designed for inhibiting normal fuze response over a specified time interval during which spurious signals generated within the fuze system might otherwise cause premature function. A capacitance means and a high voltage variable impedance means are connected in series between a plate voltage source and the input of an amplifier for blocking the firing circuit during the activation time of the plate voltage source.

4 Claims, 4 Drawing Figures

PATENTED JUN 24 1975　　3,890,900

SHEET 2

INVENTOR
WILLIAM I. GOULD, JR.

BY *S. J. Rotondi, A. J. Dupont & J. P. Vandenburg*

ELECTRICAL SAFING AND ARMING CIRCUIT

The invention described herein may be manufactured and used by or for the Government for governmental purposes without the payment to me of any royalty thereon.

This invention relates to arming circuits for electronic fuze systems in ordnance missiles. More specifically, it relates to safing and arming circuits for inhibiting normal fuze response over a specified time interval during which spurious signals generated within the fuze system might otherwise cause premature function.

In many current electronic ordnance fuze systems, the power source for various component circuits comprises a special battery known as the deferred-action battery. The typical deferred-action battery employs an electrolyte which is effectively isolated from the battery electrodes initially so that no electrical energy is available. Upon suitable actuation, effected a predetermined time after the missile is launched, the chemical reaction between the electrolyte and the electrodes commences and the battery produces the required electrical output. The thermal battery is one kind of deferred-action battery. Its electrolyte is in a solid or powder form originally and therefore is dormant at operational ambient temperatures. A heat source ignited at a desired time by an electric match melts the electrolyte so that electrical energy is produced. Another example is the reserve-type battery in which the electrolyte is separated physically from the electrodes. The reserve-type battery is subsequently activated by transferring its electrolyte to the region of the battery plates.

When the deferred-action battery of an electronic fuze is actuated, its output voltage begins to build up or increase from zero to the required operating level. The rise continues for a time interval termed the activation time. This transient in the output voltage of the fuze power supply may cause premature detonation of the missile's explosive charges. In certain fuzes employing a klystron oscillator for the fuze transmitter, the relatively slow buildup of the B+ voltage excites intermediate modes of oscillation in the klystron. That is, the klystron traverses several intermediate modes before arriving at its desired operating mode. As a result, large amplitude modulated signals are generated which appear at the detector simulating a normal target detecting signal. The aforementioned spurious signals produced within the fuze system are hereinafter referred to as false target signals.

In the past, the prevention of such premature detonations has been attempted by employing various kinds of mechanical safety and arming devices. These devices are usually arranged to delay the application of plate voltage to a firing circuit thyratron by means of integrating and switching components. Such mechanisms are large, relatively complex, and have proved unreliable in operation.

Therefore, an object of the present invention is to provide compact and simple electrical means for blocking normal functioning of a fuze amplifier for an interval in which the voltage buildup of the fuze power supply gives rise to false target signals.

Another object is to provide an electrical circuit for blocking undesired amplifier output signals during the activation time of the amplifier's deferred-action power source.

Still another object is to inhibit the operation of an amplifier in response to the transient increase of its power supply voltage.

A further object is to block false target signals in an electronic ordnance fuze caused by the rising voltage of a deferred-action battery during its activation time.

Another object of this invention is to provide an electrical circuit for preventing the normal operation of a fuze system only during the activation time of its deferred-action power source.

The specific nature of the invention, as well as other objects, uses, and advantages thereof, will clearly appear from the following description and from the accompanying drawing, in which.

Figure 3:
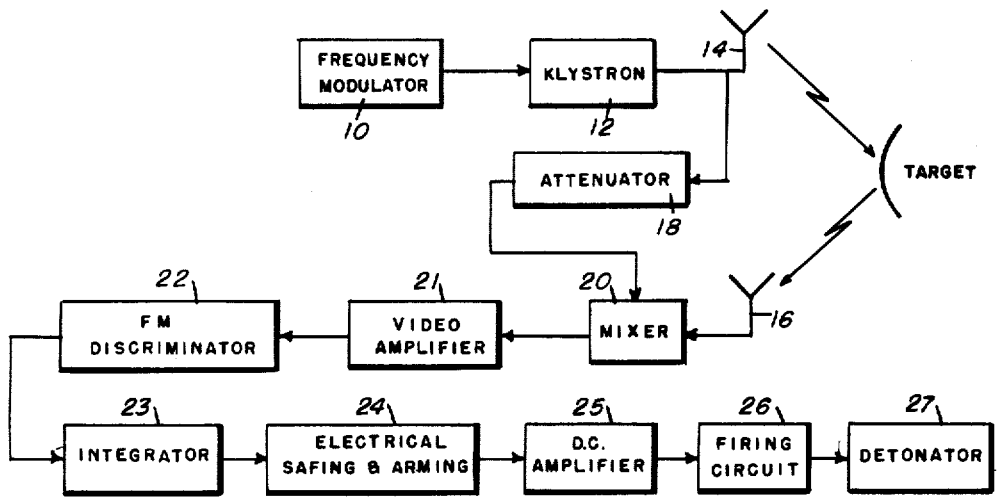
FIG. 3 is a block diagram of a typical electronic fuze system containing the safing and arming circuit of the instant invention.

One example of an electronic fuze in which the present invention may be advantageously employed is shown in FIG. 3. Therein, a fuze transmitter comprising a klystron 12 is coupled to transmitting antenna 14. The frequency of oscillation of klystron 12 is varied by a sinusoidal signal from a frequency modulator 10 in any well known manner. The fuze thus transmits a frequency modulated continuous wave signal which, after reflection by a target, appears in a receiving antenna 16. An attenuator 18 connected to klystron 12 applies a portion of the transmitted signal as a local oscillator signal to one input of a mixer 20 in the fuze receiver. Receiving antenna 16 is connected directly to a second input of mixer 20. Since the frequency of the transmitted energy is varied in a continuous periodic manner by modulator 10, the local oscillator frequency differs from that being received by antenna 16. The frequency difference appears as a result of the time required for the energy to travel to the target and return. The average frequency difference, over several modulation cycles, depends upon the target distance, for a given modulation frequency. Mixer 20 produces at its output a difference signal whose instantaneous frequency is the aforementioned frequency difference.

A video amplifier 21 applies the difference signal from mixer 20 to a frequency discriminator 22 which detects its average frequency. The output voltage of discriminator 22 is fed by means of an integrator 23 and the novel arming circuit 24 of this invention to a direct-coupled amplifier 25. The amplifier 25 responds to the appearance of a negative voltage of a predetermined magnitude at its input, corresponding to the desired target distance, to impress an initiating signal upon a thyratron firing circuit 26. Upon initiation of conduction in the thyratron circuit 26, a firing pulse is applied to energize a detonator 27.

Figure 1:
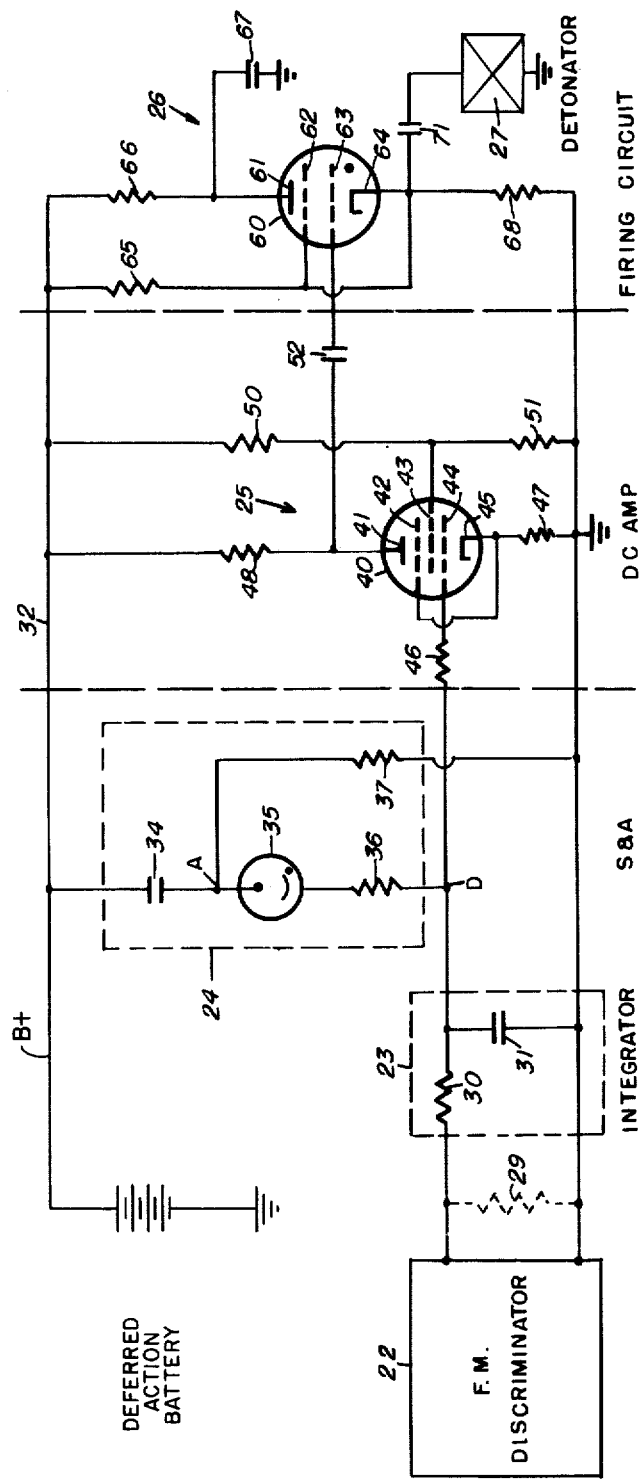
FIG. 1 is a schematic circuit diagram of a portion of an electronic fuze system incorporating a novel safing and arming circuit in accordance with the invention.

FIG. 1 illustrates more particularly the safing and arming circuit 24 together with its associated fuze components. Therein, F-M discriminator 22 is connected to integrator 23 formed by the series resistor 30 and the parallel capacitor 31. The integrator 23 substantially eliminates unwanted transients of various origins, such as background reflections or jamming attempts, which tend to cancel in the integration process. It also requires continuous sensing of an actual target for a predetermined time interval before the firing circuit can be triggered. The integrator output appears at junction point D.

The direct-coupled amplifier 25 includes a pentode 40 having a plate 41, a suppressor grid 42, a screen grid 43, a control grid 44, and a cathode 45. A deferred-action battery, for example a thermal battery, serving as the power source for the entire fuze is attached to a B+ voltage bus 32. A plate resistor 48 couples plate 41 to B+ bus 32, while suppressor 42 and cathode 45 are connected through a resistor 47 to circuit ground. The voltage divider formed by resistors 50 and 51 in series between bus 32 and ground provides operating potential for screen grid 43. A grid-limiting resistor 46 connects the pentode control grid 44 to junction point D so that the voltage output of integrator 23 is the D-C amplifier input signal.

Safing and arming circuit 24, in accordance with the invention, comprises a capacitor 34, a voltage regulator tube 35 and a current limiting resistor 36 connected together in series between bus 32 and junction D. The tube 35 is preferably a cold cathode gas diode. A resistor 37 is connected from the junction point A, between gas tube 35 and one plate of capacitor 34, to ground. The other plate of capacitor 34 is connected to bus 32, while resistor 36 is joined to point D. This circuit serves to impress a blocking or inhibiting voltage upon grid 44, in a manner described hereinafter, in response to the rising voltage present at bus 32 during battery activation.

The firing circuit 26 contains a dual-grid thyratron 60 with plate 61, control grids 62 and 63, and cathode 64. An energy storage capacitor 67 is placed between plate 61 and circuit ground. The resistor 66 connects plate 61 and capacitor 67 to voltage bus 32. Resistor 68 has one end connected to cathode 64 and the other end is grounded. Grid 62 is tied directly to cathode 64 and both are coupled to bus 32 by a resistor 65. The resistors 65 and 68 comprise a voltage divider for establishing a positive bias voltage at grid 62 and cathode 64. The output signal from the D-C amplifier is applied to control grid 63 by means of capacitor 52 connected to plate 41 of the pentode 40. A capacitor 71 couples detonator 27 to the thyratron cathode, blocking the cathode bias potential from the detonator but passing the firing pulse.

Figure 2:
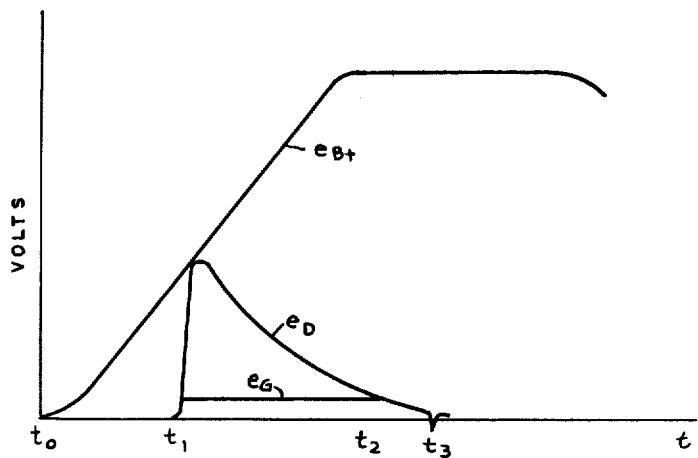
FIG. 2 is a graph showing the voltage waveforms at certain points in the safing and arming circuit of FIG. 1.

The operation of the circuit of FIG. 1 may be explained with reference to FIG. 2 which shows voltage at various points of arming circuit 24 and D-C amplifier 25. When the thermal battery is actuated, its output voltage increases from zero to operating B+ potential in the manner shown by curve $e_{B+}$ of FIG. 2. The time interval $t_0 - t_2$ is the activation time, usually of the order of 1 second, in which the voltage at bus 32 rises to a terminal value, typically, of 350 volts. In the period from $t_0$ to $t_1$, substantially all of $e_B$ appears across tube 35, since it is initially extinguished and resembles an open circuit. The voltage across capacitor 34 during this time is negligible as it charges very slowly through the large resistance of 37, which may be approximately 5 megohms. When the voltage impressed across tube 35 by the deferred-action power supply approaches the striking potential of the tube, at time $t_1$, ionization occurs and tube 35 presents a low resistance in circuit 24.

Immediately, capacitor 34 begins to charge rapidly toward the $e_{B+}$ potential. The relatively low resistance charging path is through ionized tube 35, resistors 36 and 30, and equivalent resistance 29 of the F-M discriminator output to ground. The resistances of 36 and 29 are selected, respectively, as 200 K and 400 K ohms. Resistor 30 may be varied over a selected range, for example 220 K to 750 K, to control the integration time of circuit 23.

As capacitor 34 charges during the time $t_1$ to $t_3$, a positive voltage $e_D$ (FIG. 2) appears at junction point D due to the charging current passing through resistances 29 and 30. This voltage may be expressed as $e_D = i_c (R_{29} + R_{30})$, where $i_c$ is the charging current of capacitor 34. The blocking or inhibiting voltage impressed upon the D-C amplifier 25 input at control grid 44 by safing and arming circuit 24 is illustrated by curve $e_G$ in FIG. 2. The voltage $e_G$ differs from voltage $e_D$ of point D because of the grid limiting effect of resistor 46. As the grid 44 attempts to follow $e_D$, grid current is drawn and the resulting voltage drop in resistor 46 is of such polarity as to oppose $e_D$. The D-C amplifier 25 input is therefore held at a low positive potential in the interval $t_1 - t_3$, so that false target signals from integrator 23 are not passed by amplifier 25.

Amplifier 25 is arranged to conduct at plate-current saturation when $e_{B+}$ first appears at bus 32. The voltage drop in plate resistor 48 is large; consequently, the potential at plate 41 is lower than the positive bias of thyratron cathode 64. If the discriminator 22 passes through its normal target detecting characteristic subsequent to time $t_3$, in response to sensing of a target, its negative output voltage is integrated by 23 and applied to control grid 44. The plate voltage increase of pentode 40 is coupled by capacitor 52 to the thyratron grid 63. When the initiating pulse from plate 41 exceeds the bias on cathode 64, the thyratron 60 is fired and the energy stored in capacitor 67 is applied as a firing pulse to detonator 27 to explode the missile warhead.

However, during the battery activation time, the signal $e_G$ produced at grid 44 by circuit 24 maintains plate-current saturation in pentode 40. This prevents ignition of thyratron 60 despite any negative output from integrator 23 resulting from a false target signal. In this manner the safing and arming circuit 24 blocks false target signals in response to the B+ voltage rise at bus 32.

It is, of course, required that circuit 24 must not alter the normal operational characteristics of the fuze after the period of safing. The safing and arming circuit must be self isolating subsequent to the battery activation time to avoid any change of the integration time of circuit 23. This requirement is fulfilled in the following manner. As condenser 34 is charged in the time interval $t_1 - t_3$, the charging current $i_c$ exponentially decreases and the voltage $e_D$ at junction D decreases similarly as shown in FIG. 2. The voltage across capacitor 34 continues to rise toward $e_{B+}$, so that the voltage across tube 35 decreases accordingly. Finally at time $t_3$, the voltage of tube 35 is reduced below its extinction potential, the tube ceases to conduct and becomes substantially an open circuit again. The very high impedance of de-ionized tube 35 and resistor 37 in parallel with the output of integrator 23 has no measurable effect upon the integration time. The safing and arming circuit 24 is isolated, after time $t_3$, from the fuze system.

After time $t_3$, capacitor 34 can charge fully to voltage $e_B$, through resistor 37. The resistor 37 also serves to prevent oscillation in the arming circuit 24 as the voltage across tube 35 becomes marginal.

Figure 4:
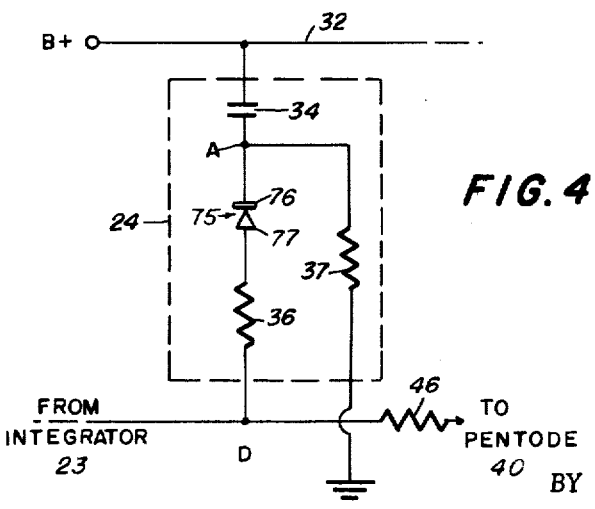
FIG. 4 illustrates another embodiment of the safing and arming circuit in accordance with the invention.

FIG. 4 illustrates an alternate embodiment of the safing and arming circuit 24. Like components have been given reference numerals identical with those of FIG. 1. In this embodiment a condenser 34, a Zener diode 75 and a current limiting resistor 36 are connected serially from B+ voltage bus 32 to junction point D. The cathode 76 of Zener diode 75 is connected to capacitor 34 and to one end of a resistor 37 which is grounded at the other end. The anode 77 is coupled through resistor 36 to junction D. The operation is similar to that of the FIG. 1 embodiment described previously. When $e_B$ exceeds the reverse voltage breakdown point of Zener diode 75 at time $t_1$, capacitor 34 is charged and the amplifier 25 is biased to plate-current saturation as before. After time $t_3$ the Zener diode 75 presents its large reverse impedance to the charging current and the voltage $e_G$ is terminated. Subsequently the large size of resistor 37 presents sufficient isolation of the safing and arming cirucit.

It will be apparent that the embodiments shown are only exemplary and that various modifications can be made in construction and arrangement within the scope of the invention as defined in the appended claims.

I claim as my invention:

1. A safing and arming circuit for blocking transients in an electronic fuze caused by the rising voltage of a deferred-action battery, comprising: an amplifier having a plate electrode connected to said battery, a control grid, an input terminal, and a resistor connecting said grid to said terminal; and an inhibiting circuit having a capacitor, a gaseous discharge voltage regulator tube, and a current limiting resistor connected serially between said battery and said input terminal for producing an inhibiting voltage at said terminal only during the rise time of said rising voltage.

2. An amplifier comprising in combination: a deferred-action battery having a predetermined activation time, and comprising a positive terminal and a negative terminal; amplifier means comprising a vacuum tube having at least a control grid, a cathode and a plate electrode, an input terminal, a resistor connecting said control grid to said input terminal, and a conductor connecting said positive battery terminal to said plate electrode; and a series circuit including a capacitor and a voltage controlled variable impedance means connected between said positive battery terminal and said input terminal so that the amplifier is inhibited only during said activation time.

3. In a frequency modulated fuze system, an F-M discriminator for producing a target indicating signal in response to a predetermined input signal; an integrating circuit connected to said discriminator; a D-C amplifier having an anode, a cathode, a control grid, an input terminal connected to said integrating circuit, and a resistor connected between said control grid and said input terminal; a deferred-action battery connected to said anode; a thyratron firing circuit coupled to said anode; a detonator connected to said firing circuit; and inhibiting means for preventing actuation of said detonator only during the activation time of said battery, said means comprising a capacitor and a gaseous voltage regulator tube connected in series between said amplifier input terminal and said battery.

4. In an amplifier having at least a control element, an input terminal, an output terminal, a power supply, and a resistor connecting said input terminal to said control element, improved means for inhibiting said amplifier during power supply voltage transients, said means comprising: a capacitor, a gaseous discharge device, and a first resistor connected in series between said power supply and said input terminal, and a second resistor connected between the junction of said capacitor and said device and ground.

* * * * *